(12) United States Patent
Shen et al.

(10) Patent No.: US 6,745,715 B1
(45) Date of Patent: Jun. 8, 2004

(54) STERN FLAP CORRECTIVE MOTION AND FUEL SAVING CONTROL SYSTEM FOR MARINE VESSELS

(75) Inventors: Young T. Shen, Potomac, MD (US); Dominic S. Cusanelli, Frederick, MD (US); Richard C. Bishop, Germantown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/364,332

(22) Filed: Feb. 12, 2003

Related U.S. Application Data

(63) Continuation-in-part of application No. 09/775,982, filed on Feb. 1, 2001, now Pat. No. 6,571,724.

(51) Int. Cl.$^7$ ................................ B63B 39/06
(52) U.S. Cl. ................ 114/284; 114/122; 114/126; 114/286
(58) Field of Search ................ 114/284–287, 122, 114/126

(56) References Cited

U.S. PATENT DOCUMENTS

| 4,261,278 A | | 4/1981 | Gaudin | |
|---|---|---|---|---|
| 5,263,432 A | * | 11/1993 | Davis | 114/286 |
| 5,383,419 A | * | 1/1995 | Stevens | 114/286 |
| 5,474,012 A | * | 12/1995 | Yamada et al. | 114/286 |

* cited by examiner

*Primary Examiner*—Sherman Basinger
(74) *Attorney, Agent, or Firm*—Jacob Shuster

(57) ABSTRACT

Corrective stabilizing motions are applied to a sea vessel hull during seawater travel in response to stern flap displacement by hydrodynamic forces induced at the buttock of the vessel hull and by the lower flap surfaces at the stern end of the sea vessel hull in response to angular displacement of flap elements from a deployed position in either in-phase or out-of-phase relation to each other in rough seas. An angle of attack range for limiting angular displacement of the flaps is selected so as to minimize resistance to travel and optimize fuel saving during propulsion of the vessel hull at different speeds under different seawater conditions.

7 Claims, 2 Drawing Sheets

STERN FLAP CORRECTIVE MOTION AND FUEL SAVING CONTROL SYSTEM FOR MARINE VESSELS

The present invention relates generally to controlled displacement of flow diverting flaps on the stern of a marine vessel, and is a continuation-in-part of application Ser. No. 09/775,982 filed Feb. 1, 2001, now U.S. Pat. No. 6,571,724.

BACKGROUND OF THE INVENTION

Typically marine vessels such as naval ships often slow down in rough seas so as to reduce seawater wave induced motions such as roll and pitch, because excessive amounts of such motion may seriously degrade combat readiness, adversely affect performance of on-board systems such as weapons and have other deleterious affects. Various methods have therefore been developed to reduce roll and pitch including use of active devices. Such active devices applied for example to fins, gyros, tanks and rudders often introduce cavitation, vibration and tip vortex problems at high travel speeds. It is therefore an important object of the present invention to provide active devices for inducing corrective motions on marine vessels during seawater travel under rough wave conditions, without introducing the problems heretofore experienced, and to also optimize fuel consumption during seawater travel at various speeds in calm water and low sea states while avoiding the cavitation problems heretofore experienced.

SUMMARY OF THE INVENTION

Pursuant to the present invention, a pair of flaps are pivotally mounted on the stern of a marine vessel between the port and starboard sides thereof, for displacement to positions with the upper surfaces thereof always exposed to air during vessel travel. The lower surfaces of such flaps when in deployed positions divert and smooth exit flow of the seawater from the stern between side plates along curved flow paths during vessel travel under rough sea conditions to hydrodynamically generate forces from the lower flap surfaces and the buttock of the vessel hull for pitch corrective purposes under in-phase displacement of the flaps and for roll corrective purposes under out-of-phase displacement of the flaps in opposite directions. During very lower speed travel the stern flaps are retracted above the water surface to avoid imposing drag penalty when corrective motion control is not needed. Flap control may also be utilized exclusively for corrective pitch motion involving use of a single flap element. The flap angular positions are also adjusted in accordance with ship speed variation to improve and optimize fuel savings during travel in calm water and low sea states. In accordance with a flap positioning control system to effect all of the foregoing aspects of the present invention, fuel savings and ship motion is improved during travel under different ship speeds and seawater conditions, including rough sea conditions as well as low sea states of the seawater.

BRIEF DESCRIPTION OF DRAWINGS

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
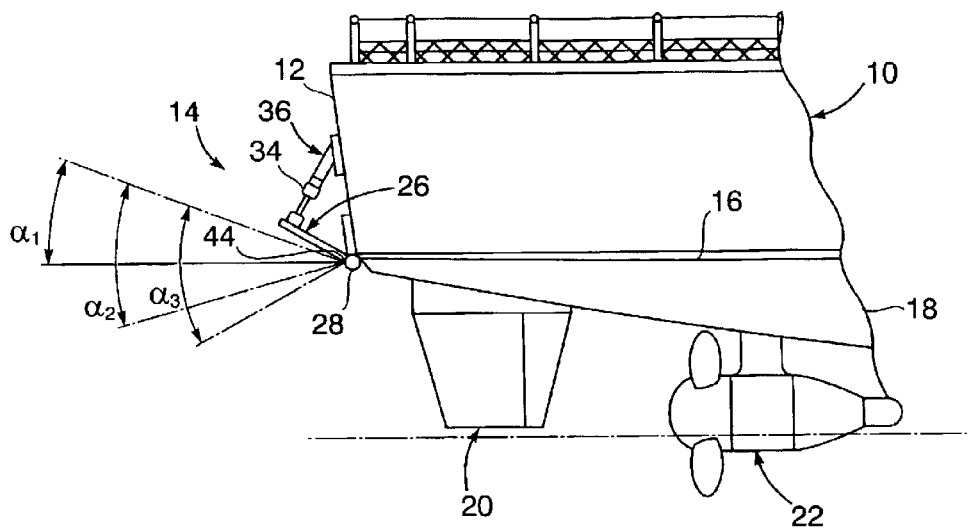
FIG. 1 is a side elevation view of a rear transom end portion of a marine vessel during seawater travel having stern mounted flaps under motion control in accordance with one embodiment of the present invention.

Referring now to the drawing in detail, FIG. 1 illustrates a transom portion of a marine vessel hull 10, having an end stern 12 to which is attached a motion-controlled flap system generally referred to by reference numeral 14. Such system 14 as shown in FIG. 1 is retracted relative to a water surface line 16 associated with a body of seawater on which the vessel hull 10 is floatingly supported during very low speed operational travel. In such retracted condition of the system 14, seawater flow from the stern 12 occurs without disturbance. A bottom buttock 18 is associated with the vessel hull 10 and extends forwardly in the direction of travel from the stern 12, with a rudder assembly 20 projecting downwardly from the buttock 18 at a location spaced between the stern 12 and a propeller assembly 22.

Figure 2:
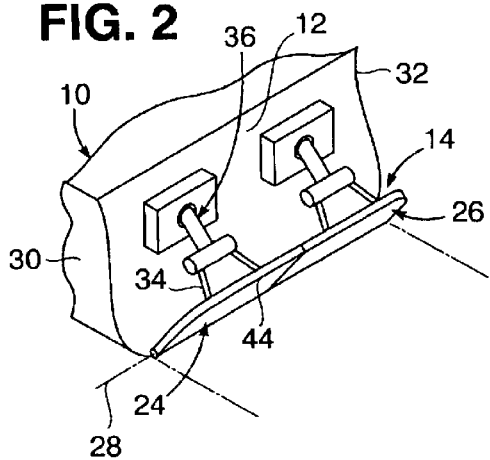
FIG. 2 is a partial perspective view of the stern portion of the vessel shown in FIG. 1, with the flaps under synchronized in-phase motion control.
Figure 2A:
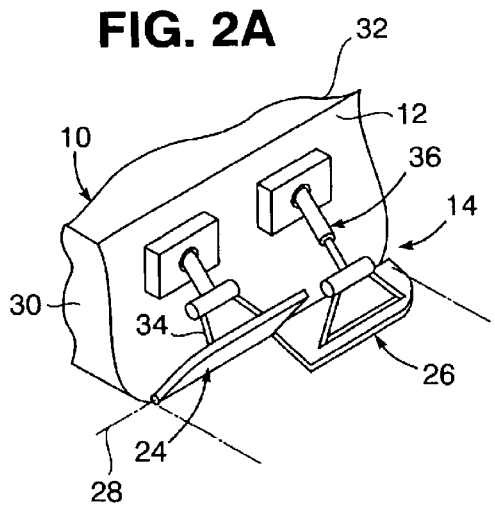
FIG. 2A is a partial perspective view similar to that of FIG. 2, but showing the flaps under out-of-phase motion control.
Figure 3:
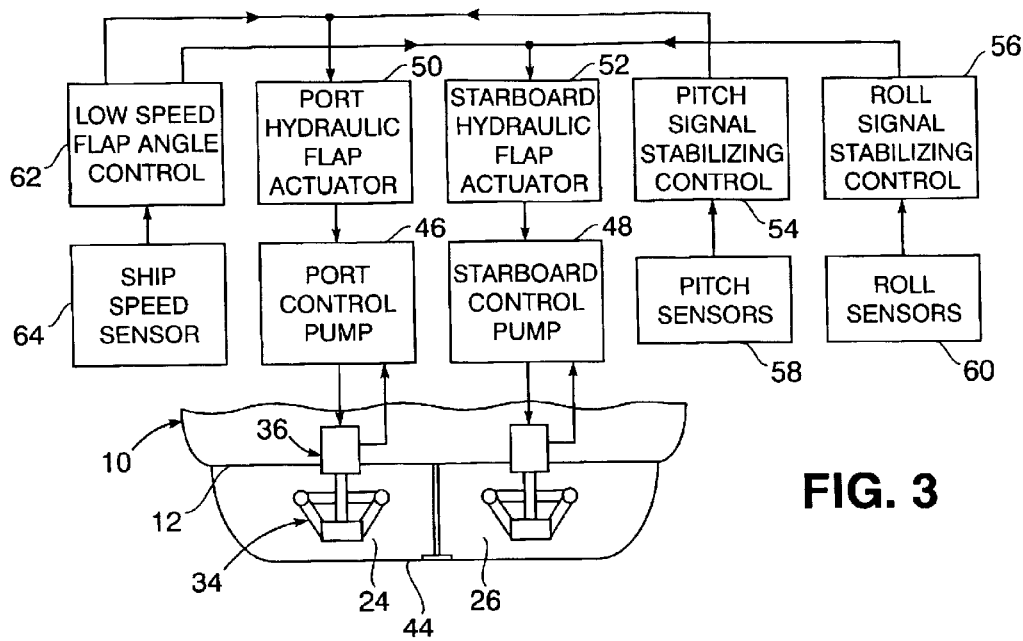
FIG. 3 is a simplified partial top plan view of the stern mounted flaps corresponding to those shown in FIG. 1, with a diagrammatically illustrated control system connected thereto.

The motion controlled flap system 12 includes a pair of flap elements 24 and 26 as shown in FIGS. 1, 2 and 2A, mounted on the stern 12 for pivotal displacement about a common axis 28 located so that the bottoms of the flap elements 24 and 26 are at the water surface. Each of the flap elements 24 and 26 respectively extends along its pivot axis 28 from the port side 30 and starboard side 32 of vessel hull 10 into sliding contact with each other as shown in FIG. 2, so as to form one flap assembly during in-phase controlled operation as hereinafter explained. Each flap element 24 and 26 is connected by a linkage assembly 34 to a piston rod projecting from a hydraulic actuator 36 extending into the ship hull 10 through the stern 12, so as to exert displacement forces on the port and starboard flap elements 24 and 26 under control of a pre-programmed control network diagrammed in FIG. 3, as hereinafter explained.

Figure 4:
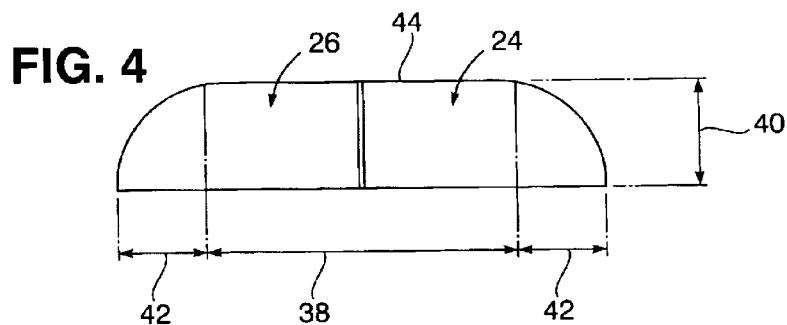
FIG. 4 is a top plane view of the pair of flaps shown in FIGS. 1, 2 and 3, with dimensional relationships indicated thereon pursuant to the present invention.

As shown in FIG. 4, an in-phase assembly of the flap elements 24 and 26 form a rear attachment edge pivotally connected to the stern 12, of fixed length dimension 38 with constant width 40 and port and starboard sections 42. Such port and starboard side sections 42 of the flap assembly have curved trailing edges extending from the mid-sections of the flap elements so as to form an edge portion 44 of the flap assembly from which exit seawater flow emerges during vessel seawater travel, with only the lower surfaces of the flap elements exposed to the seawater. The flap elements 24 and 26 will thereby generate hydrodynamic forces which cooperate with hydrodynamic forces at the buttock 18 of the vessel hull 10 in order to provide stabilizing motions counteracting pitch when the flap elements 24 and 26 are in the in-phase condition as shown in FIG. 2 and counteracting roll when in the out-of-phase condition shown in FIG. 2A. The flap assembly is also retracted from the seawater at very low travel speeds, such as 6 to 8 knots, so as to avoid drag penalty that would otherwise be imposed.

The displacement of the flap elements 24 and 26 for corrective motion control as hereinbefore referred to is effected within certain angle of attack ranges to achieve maximum reduction in ship resistance and maximize fuel savings under different speeds. Toward that end the flap elements 24 and 26 are displaced to positions which respectively accommodate low ship speeds within an angle range $\alpha_1$, designed ship speed within an angle range $\alpha_2$, and high speeds within an angle of attack range $\alpha_3$ as denoted in FIG. 1.

As a result of the foregoing described flap mounting arrangement and control, the present invention features provision of flap induced corrective opposition to unsteady pitch or roll that is induced under seawater wave conditions, as well as to provide angular flap adjustments for optimizing saving of fuel utilized for vessel propulsion during travel at different speeds in low sea states to interrelate with associated flap element dimensions 38, 40 and 42 as denoted in FIG. 4. Toward that end, the flap displacement hydraulic piston devices 36 are respectively connected to port and starboard control pumps 46 and 48, as diagrammed in FIG. 3, to which signal controlled actuators 50 and 52 are respectively connected. Signals are respectively fed to the actuators 50 and 52 from pitch and roll stabilizing controls 54 and 56 to which pitch and rollsensors 58 and 60 are connected. The port and starboard flap control actuators 50 and 52 are also connected to a flap angle control 62 to which a ship speed sensor 64 is connected so as to reduce ship resistance and improve fuel savings at low sea state condition when corrective flap stabilizing control is not being applied.

Figure 4A:
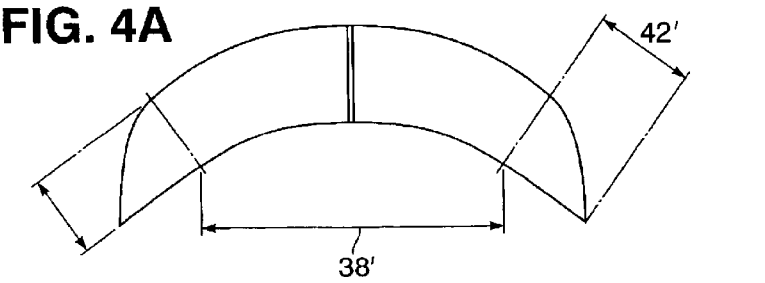
FIG. 4A is a top plan view corresponding to FIG. 4 showing a pair of differently shaped flaps which may be utilized in accordance with another embodiment of the present invention.

The flap mounting and control arrangement as hereinbefore described was applied to a flat surface type of stern 12. The system of the present invention is however also applicable to ship hulls with curve-surfaced sterns, in which case the flap assembly is provided with a curved attachment edge having length dimensions 38' and 42'and a width dimension 40' as shown in FIG. 4A.

Thus, pursuant to the present invention rough sea stabilizing motions are imparted by controlled displacement of the deployed stern mounted flap elements 24 and 26 with upper surfaces thereof exposed to the air. Such flap elements are also retracted for drag avoidance purposes at very low speeds. In calm and low sea states, the flap elements arc angularly positioned in accordance with different vessel travel speeds to optimize fuel savings and avoid cavitation problems. Furthermore, the corrective system arrangement as diagrammed in FIG. 3 may be utilized to limit corrective flap displacement to a single flap element for corrective pitch motion control purposes.

Obviously, still other modifications and variations of the present invention may be possible in light of the foregoing teachings. It is therefore understood that within the scope of the appended claims the invention may be practiced otherwise than as specifically described.

What is claimed is:

1. A system for enhancing propulsion of a marine vessel hull having a stern on which a flap assembly is movably mounted, comprising: deployment means connected to the flap assembly for displacement to hydrodynamically induce stabilizing motions applied to the vessel hull; and corrective control means connected to the deployment means for regulating said displacement of the flap assembly to avoid drag in the seawater and maximize the stabilizing motions during said propulsion of the vessel hull at different travel speeds and sea states.

2. The system as defined in claim 1, wherein said flap assembly includes a pair of flap elements pivotally mounted on the stern; and said corrective control means includes: means for in-phase displacement of the flap elements to induce hydrodynamic forces in response to pitch motions imparted to the vessel hull under rough seawater conditions; and means for out-of-phase displacement of the flap elements to induce hydrodynamic forces in response to roll motions imparted to the vessel hull.

3. The system as defied in claim 2, wherein the flap elements have a curved trailing edge from which exit flow of seawater is induced during said displacement of the flap elements inducing the hydrodynamic forces.

4. The system as defined in claim 1, including: means for angularly regulating said displacement of the flap assembly within different angle ranges to optimize fuel savings during said propulsion of the vessel hull at the different speeds while undergoing seawater travel.

5. The system as defined in claim 1, wherein said flap assembly includes a flap element pivotally mounted on the stern to which said corrective control means imparts angular displacement through which said stabilizing motions is induced.

6. In combination with a marine vessel having a stern and undergoing travel in seawater in response to propulsion thereof induced by consumption of fuel, a system for stabilizing motions imparted to the vessel during said travel thereof, comprising: flap means mounted on the stern of the vessel for pivotal displacement to a deployed position; and corrective control means operatively connected to the flap means for pivotal displacement thereof from said deployed position to induce hydrodynamic forces within the seawater imparting said stabilizing motions to the vessel in rough seas and with reduced resistance to said travel thereof and with optimized saving of the fuel consumed during said propulsion of the vessel in calm water and low sea states.

7. The combination as defined in claim 6, wherein the flap means has upper and lower surfaces, with the lower surface inducing the hydrodynamic forces in response to said displacement of the flap means while the upper surface is exposed to air.

* * * * *